United States Patent [19]

Jones

[11] 3,818,542

[45] June 25, 1974

[54] OBSTACLE CLEARING ATTACHMENT FOR CASTER WHEELS

[76] Inventor: Robert L. Jones, 715 N. 55th St., Lincoln, Nebr. 68504

[22] Filed: Feb. 12, 1973

[21] Appl. No.: 331,897

[52] U.S. Cl. .................... 16/18 CG, 16/19, 16/41
[51] Int. Cl. .......................................... B60b 33/00
[58] Field of Search .......... 16/19, 18 CG, 41, 18 A, 16/18; 280/152.1

[56] References Cited
UNITED STATES PATENTS

| | | | |
|---|---|---|---|
| 2,332,089 | 10/1943 | Knight | 16/18 A |
| 2,613,389 | 10/1952 | Cramer | 16/18 CG |
| 2,830,545 | 4/1958 | Robinson et al. | 16/18 CG |

*Primary Examiner*—Bobby R. Gay
*Assistant Examiner*—Doris L. Troutman

[57] ABSTRACT

A caster construction includes an obstacle clearing member supported continuously in advance of the path of rolling movement of the caster for free vertical movement above and preferably below the floor contacting surface of the caster wheel such that the clearing member preferably slides continuously along the floor to clear objects from the path of the wheel, but yet can move upwardly relative to the wheel should the wheel encounter a depression in the floor. The free vertical movement also compensates for wear along the lower edge of the member. The clearing member may be a cylindrical sleeve slidably supported or guided by a support means coupled to the caster swivel spindle or other appropriate part of the caster construction or the device to which the caster is attached. The attachment is particularly useful for mechanic's creeper wheels.

15 Claims, 3 Drawing Figures

PATENTED JUN 25 1974 3,818,542
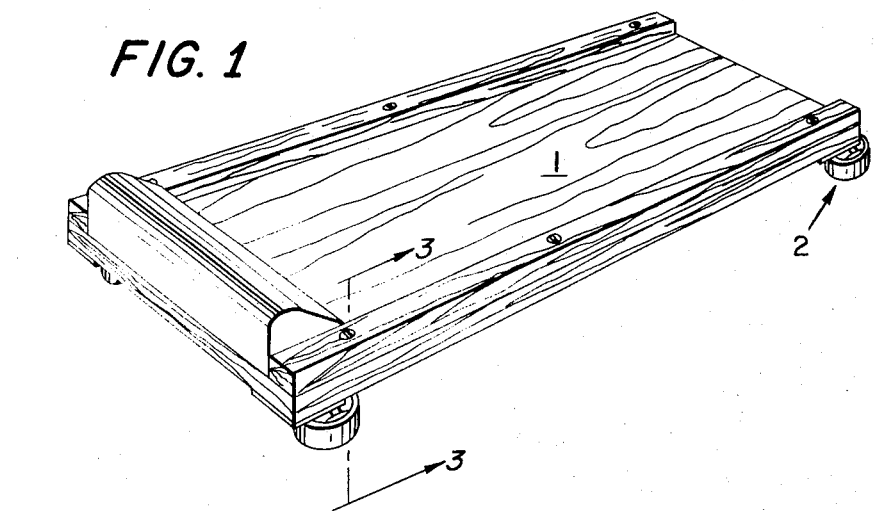
FIG. 1
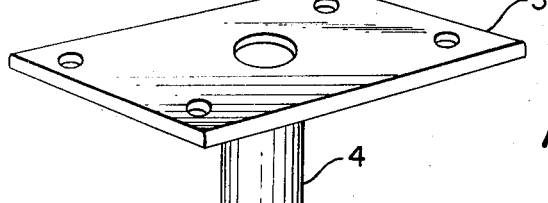
FIG. 2
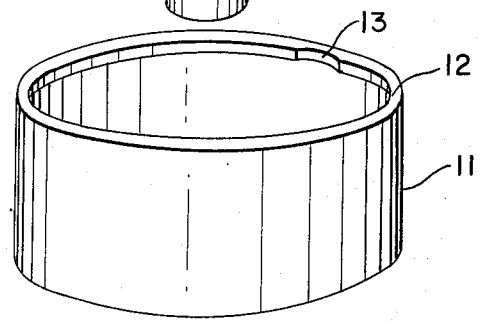
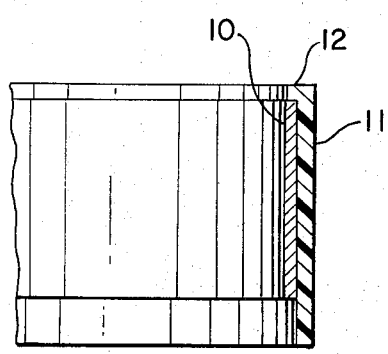
FIG. 3
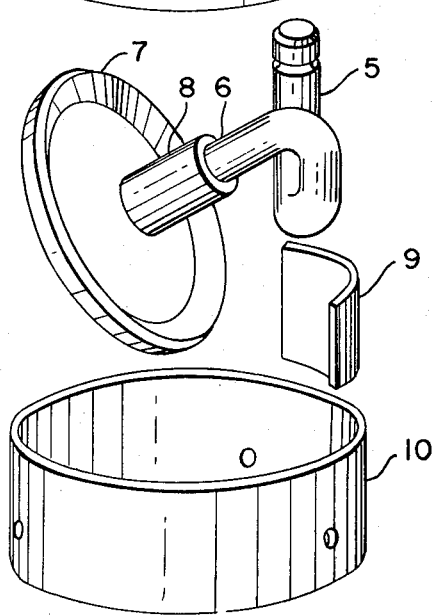

OBSTACLE CLEARING ATTACHMENT FOR CASTER WHEELS

FIELD OF THE INVENTION

This invention relates to the field of caster guards or protective devices for casters, that is, such devices intended to clear obstacles such as electrical wires, droplight cords, air hose, rags, wrenches, cotter keys, etc, from the rolling path of the caster wheel so as to prevent obstruction of the rolling movement of the caster wheel by such objects. This is a particularly important consideration for casters used on mechanic's creepers (commonly referred to as creeper wheels), since safety considerations require that a mechanic be able to get out from beneath an automobile quickly. Quite apart from safety considerations, such an attachment which will prevent the obstructing of creeper wheels obviously will have a favorable effect on the disposition of mechanics.

BACKGROUND AND SUMMARY

Caster wheels seem to have an inborn ability to be easily obstructed by objects lying on the floor, and this ability is especially apparent in automobile garages and repair shops where it is impossible to keep obstructing objects off the floor. Quite apart from the aggravation caused by such obstructions, there is also the danger that caster wheels will cut electrical cords lying on the floor. The need to avoid this general problem has been recognized, and numerous solutions have been proposed, examples of which can be found in U.S. Pat. Nos. 2,450,062, 2,996,752, 335,148, and 2,471,958. Some of these proposed solutions have involved rigid guards mounted on the caster to move along in advance of the rolling wheel at a fixed distance above the floor, the guard being substantially rigid. Although these proposed constructions have their advantages, they also have distinct disadvantages in that, if they are rigidly fixed close to the floor, they will not compensate for slight depressions into which the caster wheel may drop, and if fixed higher above the floor, they will necessarily miss many small objects which will obstruct the rolling movement of the caster wheel. It has also been proposed to provide such a guard in the form of downwardly depending bristles for sweeping the rolling path of the caster wheel. However, I consider that the clearing or sweeping action of such bristles is not sufficiently positive as to clear all objects. Additionally, such bristles are conventionally fixed at their upper ends to a member which in turn is fixed to the caster construction, and thus there is no compensation, automatic or otherwise, for wear of the bristles. Also, if the caster wheel drops into a small depression, this tends to break the bristles or permanently deform them when they are forced downwardly against the floor. I consider that my obstacle clearing arrangement is superior to these previous proposals and that it possesses substantially all their advantages, while avoiding at least many of their disadvantages.

Without detracting from the more particular features of my novel construction as hereafter described, a basic concept of my invention involves the provision of a freely vertically movable clearing member which preferably slides along the floor in advance of the caster wheel or creeper wheel, although it may be supported with a slight clearance above the floor, and which can move upwardly relative to the wheel should the wheel drop into a small depression. At the same time, the preferred vertically floating nature of my clearing member permits automatic compensation for wear along the lower edge of the clearing member. Although devices incorporating this concept can take numerous forms, I presently prefer to utilize a cylindrical clearing member of plastic, slidably supported vertically on a cylindrical sleeve which encompasses the caster wheel but which is spaced well above the floor, the cylindrical clearing member being free to drop downwardly such that its lower edge preferably slides along the floor, with the clearing member floating freely vertically. Of course, different caster constructions will call for different mounting arrangements, and various arrangements can be used while retaining the concept of a vertically floating clearing member or guard. For instance, guidance or support for the clearing member could be from the swivel spindle, the wheel shaft, the mounting plate, or from the object to which the caster is attached.

Other and further advantages, features and the like of my invention will be apparent from the ensuing description of a preferred embodiment taken in conjunction with the accompanying drawings.

BRIEF DESCRIPTION OF THE DRAWINGS

FIG. 1 is a general perspective view of a conventional mechanic's creeper utilizing creeper wheels or casters provided with attachments in accordance with the invention.

FIG. 2 is an exploded perspective view of the components of a conventional creeper wheel or caster and the components of a typical preferred embodiment of an attachment in accordance with my invention.

FIG. 3 is a fragmentary sectional view showing the cylindrical clearing member slidably mounted on a supporting sleeve.

DESCRIPTION OF THE PREFERRED EMBODIMENT

A conventional mechanic's creeper is shown in FIG. 1, and includes creeper wheels or casters 2 provided with obstacle clearing attachments in accordance with a preferred embodiment of my invention. As shown in detail in the remaining figures, the overall caster construction includes a conventional caster comprising a mounting plate 3 carrying a cylindrical spindle housing 4 into which a spindle 5 is swivelly mountable. The tubular member of which spindle 5 forms a part is bent into a configuration as shown in FIG. 2, so as to form a caster wheel shaft or axle 6 for rotatably mounting the shaft housing 8 of a caster wheel 7. Components 3-8 together constitute a well known and commercially available creeper wheel or caster construction.

The illustrated components of the clearing attachment in accordance with my invention comprise a steel supporting sleeve 10, an optional steel spacing member 9, and a clearing member in the form of a plastic sleeve 11 provided with a flange 12 along its upper edge. Metal spacing member 9 is to be welded to the inner surface of steel sleeve 10, and to the spindle 5 of the caster. Steel sleeve 10 thus will be rigidly mounted on the caster so as to surround the spindle 5 and wheel 7, with the lower edge of the sleeve 10 being spaced substantially above the floor contacting area of wheel 7, that is, the lowermost point of wheel 7. This clearance from the floor may be on the order of one half inch.

Plastic sleeve 11 encompasses and is slidably guided and supported by sleeve 10, the diameters of the two sleeves being such as to ensure free relative movement between the two. Flange 12 on sleeve 11 holds sleeve 11 on sleeve 10 should the creeper be lifted off the floor. Sleeve 11 is so dimensioned that it is free to slide downwardly relative to sleeve 10 to a point at least as low as the lowermost point of caster wheel 7, and preferably below the lowermost point of caster wheel 7, such that in use the lower edge of plastic sleeve 11 is supported vertically by the floor, and slides along the floor during movement of the creeper. During use the flange 12 will be lifted off the upper edge of sleeve 10 by a distance sufficient to compensate for reasonable wear of the lower edge of plastic sleeve 11. Should the creeper wheel drop into a small depression on the floor, sleeve 11 automatically moves upwardly relative to sleeve 10. An optional notch 13 may be formed in flange 12 to partially embrace either spindle 5 or spindle housing 4 so as to prevent rotation of plastic sleeve 11 about steel sleeve 10. If it is desired to permit plastic sleeve 11 to rotate relative to steel sleeve 10, notch 13 may be omitted, and flange 12 so dimensioned as to be clear of spindle 5 and spindle housing 4. This may be facilitated by the use of a spacer member such as member 9, which determines the radial distance between the sleeves and the adjacent surfaces of spindle housing 4 and spindle 5. For instance, it is desired to permit sleeve 11 to rotate, spacer member 9 may be of such a thickness as to ensure that there is an adequate clearance between spindle housing 4 or spindle 5 and the innermost edge of flange 12. If it is desired not to permit such rotation, then spacer member 9 and flange 12 should be dimensioned appropriately such that a notch 13 formed in flange 12 will partially encompass spindle housing 4 or shaft 5.

It will be obvious that as the creeper is moved across the floor, the plastic sleeves will always make contact with and slide along the floor, pushing all objects out of the way so that the wheels never come in contact with an object to be obstructed thereby.

Flange 12 is merely exemplary of various manners in which sleeve 11 may be retained on sleeve 10. An alternative arrangement which is entirely satisfactory, but slightly more expensive to produce, comprises two screws or pins extending radially outwardly from steel sleeve 10 opposite each other, and passing freely through vertical slots in plastic sleeve 11 so that the plastic sleeve can move freely up or down. This arrangement avoids the need for flange 12, and hence sleeve 11 may be completely cylindrical. Also, steel sleeve 10 may be attached to the assembly in various manners, such as by a spider arrangement or clamping arrangement which might embrace, for instance, spindle housing 4 or spindle 5, and indeed other supports could be provided for floatingly guiding sleeve 11 Sleeve 11 or other form of clearing member could be formed so as to slide along the floor only in the advancing rolling path of wheel 7, but I much prefer that the clearing member entirely encompass the wheel as is accomplished by the cylinder or other member of substantially closed perimeter. Furthermore, sleeve 10 may be of plastic, with spacer 9 formed as a separate or integral clamp or the like for connecting sleeve 10 to the spindle 5 or spindle housing 4, or as a spacer with a bore hole for vertically receiving spindle 5.

Although I prefer that sleeve 11 actually slide along the floor surface, the sleeve could be dimensioned such that its lower edge has substantially zero clearance with the floor, or has a slight positive clearance so as to minimize any accummulation of dirt, oil, grease, etc. along its lower edge. Adjustment screws or the like could be incorporated so as to permit setting of the sleeve at any desired clearance, while retaining its ability to move freely upwardly when the wheel moves into a depression. Thus, adjustment screws could pass downwardly through threaded openings in flange 12 so that their lower ends would abut the upper edge of sleeve 10 to support sleeve 11, and thus simple adjustments would permit sleeve 11 to either slide along the floor surface or to clear the floor surface by a desired clearance.

I claim:

1. In combination, a caster construction comprising a caster wheel; a shaft rotatably supporting said wheel; means for swivelly mounting said wheel and shaft on a device to be rollably supported on a floor surface at least partially by said wheel; and obstacle clearing means for moving along the floor in advance of said wheel during rolling movement thereof and pushing objects away from the rolling path of said wheel; said obstacle clearing means comprising an obstacle clearing member, and means supporting said obstacle clearing member in advance of said rolling path for free vertical movement of its lower edge, independently of and relative to said mounting means and independently of the weight of the device to be supported by the caster wheel, between a lowermost point at least nearly as low as the floor contacting area of said wheel and an uppermost point at least above said lowermost point, whereby said obstacle clearing member continuously moves along in advance of said wheel to clear obstacles from the floor and prevent encounter therewith by said wheel.

2. A caster construction as claimed in claim 1 wherein said obstacle clearing member is arcuate as viewed normal to the floor surface and has a closed perimeter encompassing said wheel.

3. A caster construction as claimed in claim 1 wherein said obstacle clearing member is slidably mounted for free vertical sliding movement relative to said supporting means.

4. A caster construction as claimed in claim 3 wherein said lowermost point of vertical movement of said lower edge permitted by said supporting means is lower than the floor contacting area of said wheel so as to slide along the floor, and the uppermost point is above the floor contacting area of said wheel.

5. A caster construction as claimed in claim 4 wherein said obstacle clearing member substantially surrounds said wheel as considered normal to the floor surface.

6. A caster construction as claimed in claim 5 wherein said obstacle clearing member is cylindrical.

7. A caster construction as claimed in claim 1 wherein said supporting means is connected to said mounting means, and said obstacle clearing member is slidably mounted on said supporting means for limited free vertical movement relative to the floor.

8. A caster construction as claimed in claim 7 wherein said supporting means is circular as viewed normal to the floor and is rigidly coupled to said mounting means.

9. A caster construction as claimed in claim 8 wherein said supporting means is a cylindrical sleeve, the lower edge of which lies in a fixed plane substantially above the floor contacting area of said wheel.

10. A caster construction as claimed in claim 9 wherein said cylindrical obstacle clearing meer surrounds said cylindrical sleeve with a free sliding clearance, and includes a flange member at its upper end extending inwardly over the upper edge of said cylindrical sleeve.

11. A caster construction as claimed in claim 10 wherein said mounting means includes a vertical spindle and spindle housing, one of which is rigidly connected to the inner surface of said cylindrical sleeve, and wherein said flange member includes a notched portion partially encompassing one of said spindle and spindle housing so as to prevent rotation of said obstacle clearing member relative said cylindrical sleeve.

12. A caster construction as claimed in claim 10 wherein said mounting means includes a vertical spindle, and said cylindrical sleeve includes a spacing member on its interior surface, said spacing member being coupled rigidly to said vertical spindle so as to space said vertical spindle from said flange member and permit free rotation of said obstacle clearing member about said cylindrical sleeve.

13. A caster construction as claimed in claim 9 wherein said mounting means includes a vertical spindle and spingle housing, and said cylindrical sleeve mounting member is rigidly connected to said vertical spindle.

14. A caster construction as claimed in claim 1 wherein said lowermost point of vertical movement of said lower edge is substantially at the level of the floor contacting area of said wheel so as to have substantially zero clearance with the floor.

15. A caster construction as claimed in claim 1 wherein said lowermost point of vertical movement of said lower edge is slightly above the level of the floor contacting area of said wheel so as to slightly clear the floor.

* * * * *